UNITED STATES PATENT OFFICE.

CHARLES TENNANT DUNLOP, OF GLASGOW, NORTH BRITAIN.

IMPROVEMENT IN MANUFACTURE OF OXIDE OF MANGANESE.

Specification forming part of Letters Patent No. 29,474, dated August 7, 1860.

*To all whom it may concern:*

Be it known that I, CHARLES TENNANT DUNLOP, of Glasgow, in the county of Lanark, North Britain, chemist, have invented certain new and useful Improvements in the Manufacture or Production of Artificial Oxide of Manganese; and I do hereby declare that the following is a full, clear, and exact description of the principle or character which distinguishes them from all other things before known, and of the usual manner of making, modifying, and using the same—that is to say:

My said invention consists in boiling with carbonate of lime, and at a temperature of about 280° of Fahrenheit's thermometer, the chloride of manganese commonly obtained as a waste product in the manufacture of chlorine. The requisite temperature is easily obtained by performing the operation of boiling under pressure. A carbonate of manganese is thus obtained, together with chloride of calcium, the latter of which is soluble in water, and is thereby separated from the carbonate of manganese. The carbonate of manganese thus obtained is gently heated at a temperature below redness, or about 480° or 580° of Fahrenheit's thermometer, when it parts with its carbonic acid and absorbs oxygen from the atmosphere. I have in this way been able to prepare an oxide of manganese containing eighty-two per cent. of peroxide.

In this way, by a simple expenditure of finely-divided carbonate of lime, a constant supply of peroxide of manganese suitable for the production of chlorine may be prepared for himself by the chlorine-manufacturer.

What I claim as my invention is—

The manufacture or production of artificial oxide of manganese by boiling with carbonate of lime, and at a temperature of about 280° of Fahrenheit's thermometer, or under pressure, the chloride of manganese commonly obtained as a waste product in the manufacture of chlorine.

C. T. DUNLOP.

Witnesses:
 DUNCAN SMITH,
 P. T. HEARTT,
 EDMUND HUNT.